(12) United States Patent
Hecht

(10) Patent No.: US 6,508,404 B2
(45) Date of Patent: Jan. 21, 2003

(54) SYMBOLOGY SCANNING SYSTEM FOR EFFICIENTLY LOCATING CODED SYMBOLOGIES

(75) Inventor: Kurt Hecht, Hartsville, PA (US)

(73) Assignee: Accu-Sort Systems, Inc., Hatfield, PA (US)

( * ) Notice: Subject to any disclaimer, the term of this patent is extended or adjusted under 35 U.S.C. 154(b) by 0 days.

(21) Appl. No.: 10/024,409

(22) Filed: Dec. 18, 2001

(65) Prior Publication Data

US 2002/0139851 A1 Oct. 3, 2002

Related U.S. Application Data

(63) Continuation of application No. 08/813,917, filed on Mar. 7, 1997, now abandoned.

(51) Int. Cl.[7] .................................................. G06K 7/10
(52) U.S. Cl. ............................. 235/462.08; 235/462.18
(58) Field of Search ........................ 235/462.08, 462.07, 235/462.16, 462.18, 462.19

(56) References Cited

U.S. PATENT DOCUMENTS

| | | | | |
|---|---|---|---|---|
| 3,979,577 A | * | 9/1976 | Seligman ................ | 235/462.18 |
| 4,158,435 A | * | 6/1979 | Nakanishi et al. ...... | 235/462.18 |
| 4,812,918 A | | 3/1989 | Carbone .................... | 358/293 |
| 4,822,986 A | | 4/1989 | Guthmueller et al. ....... | 235/462 |
| 4,859,840 A | * | 8/1989 | Hasegawa et al. ...... | 235/462.18 |
| 4,939,354 A | | 7/1990 | Priddy et al. ................ | 235/456 |
| 4,973,830 A | * | 11/1990 | Ouchi et al. ................. | 235/437 |
| 4,983,817 A | | 1/1991 | Dolash et al. ............... | 235/462 |
| 5,077,463 A | * | 12/1991 | Sato ............................ | 235/436 |
| 5,278,400 A | | 1/1994 | Appel ......................... | 235/494 |
| 5,343,028 A | | 8/1994 | Figarella et al. ............ | 235/462 |
| 5,404,004 A | | 4/1995 | Sato et al. ................... | 235/463 |
| 5,412,197 A | | 5/1995 | Smith .......................... | 235/462 |
| 5,451,761 A | | 9/1995 | Kawai et al. ................ | 235/463 |
| 5,457,309 A | | 10/1995 | Pelton ......................... | 235/462 |
| 6,059,187 A | * | 5/2000 | Sato et al. ............. | 235/462.16 |

FOREIGN PATENT DOCUMENTS

| EP | 0036950 | 10/1981 |
|---|---|---|
| EP | 0667592 A1 | 1/1995 |

* cited by examiner

*Primary Examiner*—Mark Tremblay
(74) *Attorney, Agent, or Firm*—Volpe & Koenig, P.C.

(57) ABSTRACT

A scanner for optically scanning coded symbologies including a signal processing unit for pre-processing the scanned symbology information and a hardware symbology locating unit. An analog signal related to the reflectivity of the different portions of the coded symbology is obtained and is converted to digital gray-scale. The portion of the analog signal which corresponds to the substrate reflectance (absolute contrast) is removed, and the available dynamic range of the analog to digital converter is used only for the information-bearing portion of the signal (relative contrast). Since all of the decodable information is ultimately encoded in binary form, the information-bearing portion of the signal is retained. The hardware symbology locating unit includes a plurality of shift registers, each of which derives a value from an input seed which is based upon the width of a detected coded symbology element. The value of a subsequent input seed is compared to the values generated from a prior input seed. Based upon this comparison, the unit determines whether the size of a subsequent symbology element is a ratio match of a prior symbology element. The presence of a potential coded symbology candidate is likely when a plurality of ratio matches are detected.

7 Claims, 14 Drawing Sheets

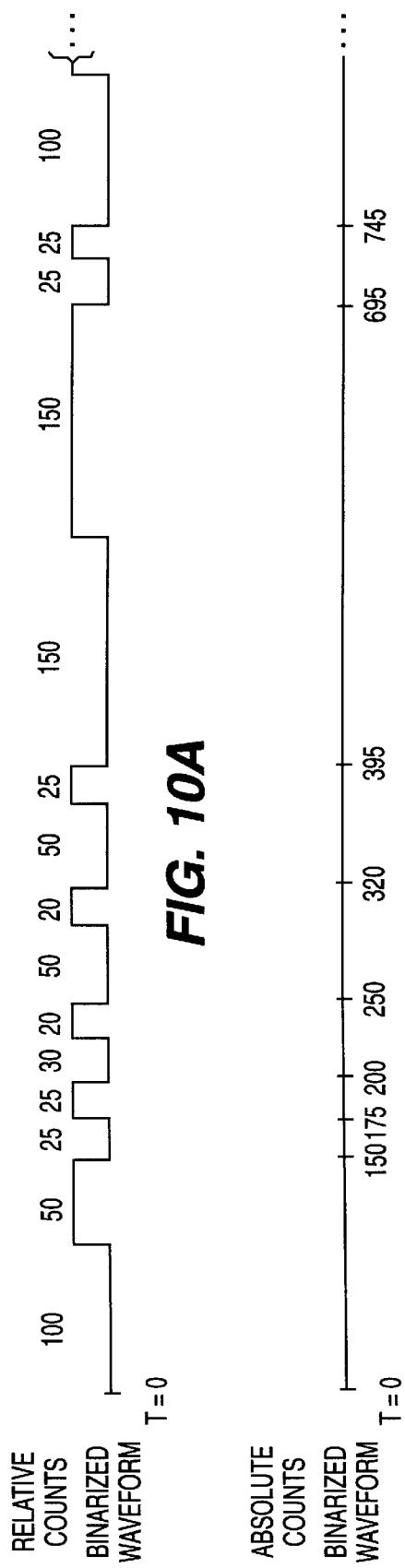
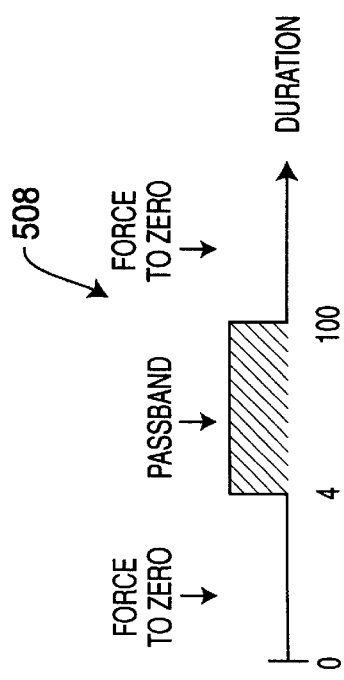
FIG. 10A
FIG. 10B
FIG. 11

SYMBOLOGY SCANNING SYSTEM FOR EFFICIENTLY LOCATING CODED SYMBOLOGIES

CROSS REFERENCE TO RELATED APPLICATIONS

This application is a continuation of application Ser. No. 08/813,917, filed on Mar. 7, 1997 now abandon.

BACKGROUND

1. Field of the Invention

This invention relates generally to optical scanning systems. More specifically, the invention relates to a coded symbology scanning system which includes a signal processor for pre-processing scanned symbology information and a hardware symbology locator for high-speed locating of potential coded symbology candidates.

2. Description of Related Art

Coded symbologies are being used in an increasingly diverse array of applications. The ability to track a large amount of items quickly and efficiently has lead coded symbologies to be used in applications such as retail checkout, warehousing, inventory control and document tracking. As the volume of items tracked by coded symbologies has increased, the need for optical scanners which operate at high speeds has likewise increased. Many current optical scanners are able to promptly locate and decode a variety of coded symbologies. However, these scanners require high-speed microprocessors and large amounts of accompanying memory, both of which are very expensive.

It has also become common to find more than one coded symbology label affixed to a product. For example, as shown in FIG. 1, a package may have several coded symbology labels which are affixed to the package; such as a manufacturer's label, a distributor's label and a retailer's label. Each coded symbology label may be printed on a different substrate or background. The manufacturer's label is typically printed as part of the original package. The coded symbology labels of the distributor and retailer, however, may be printed on stickers that are affixed at a later date.

Different coded symbology labels typically have different reflectivity characteristics as normalized by the wavelength of the scanner laser light, i.e., the amount of light that is reflected by the symbology elements. Although some labels may have a flat (i.e., non-shiny) appearance and a lower reflectivity, other labels have a very shiny appearance and a high reflectivity. In order to accurately read all coded symbology labels, it is critical to account for the differences in reflectivity. This requires a scanner with a wide dynamic range.

Most current scanning systems scan a coded symbology by focusing a scanned laser light on a label, detecting light reflected from the label and generating an analog waveform from the reflected light which is representative of the coded symbology. The analog waveform is then converted to binary digital form using an analog to digital converter. Since the transition from analog directly to digital ultimately results in a loss of data, error correction often cannot be adequately performed on an erroneous signal.

High-speed analog to digital converters are typically fixed resolution devices, (e.g. 8 or 10 bit devices), and the number of bits available for encoding the scanned information is fixed. As the dynamic range required for the specific application increases, the resolution of the scanner decreases. This results in limitations when the information is ultimately to be represented in digital form.

Accordingly, there exists a need for a high-speed, efficient coded symbology scanning system.

SUMMARY

The present invention comprises a scanner for optically scanning coded symbologies which includes a signal processing unit for pre-processing the scanned symbology information and a hardware symbology locating unit. An analog signal related to the reflectivity of the different portions of the coded symbology is obtained and sampled at the Nyquist frequency, or higher, to retain the information embodied within the signal, and is converted to digital gray-scale. The portion of the analog signal which corresponds to the substrate reflectance (absolute contrast) is removed, and the available dynamic range of the analog to digital converter is used only for the information-bearing portion of the signal (relative contrast). Since all of the decodable information is ultimately encoded in binary form, the information-bearing portion of the signal is retained.

The hardware symbology locating unit includes a plurality of shift registers, each of which derives a value from an input seed which is based upon the width of a detected coded symbology element. The value of a subsequent input seed is compared to the values generated from a prior input seed. Based upon this comparison, the unit determines whether the size of a subsequent symbology element is a ratio match of a prior symbology element. The presence of a potential coded symbology candidate is likely when a plurality of ratio matches are detected.

Accordingly, it is an object of the invention to provide a high-speed symbology locating device which is computationally efficient and does not require a large amount of memory.

Other objects and advantages will become apparent to those skilled in the art after reading the detailed description of a presently preferred embodiment.

BRIEF DESCRIPTION OF THE DRAWING(S)

FIG. 10A is a flow diagram of a binary waveform comprising a series of pulses of varying durations in relative counts;

FIG. 10B is the flow diagram of FIG. 10A in absolute counts;

FIG. 11 is the bandpass filter used in the present invention;

Figure 13A:
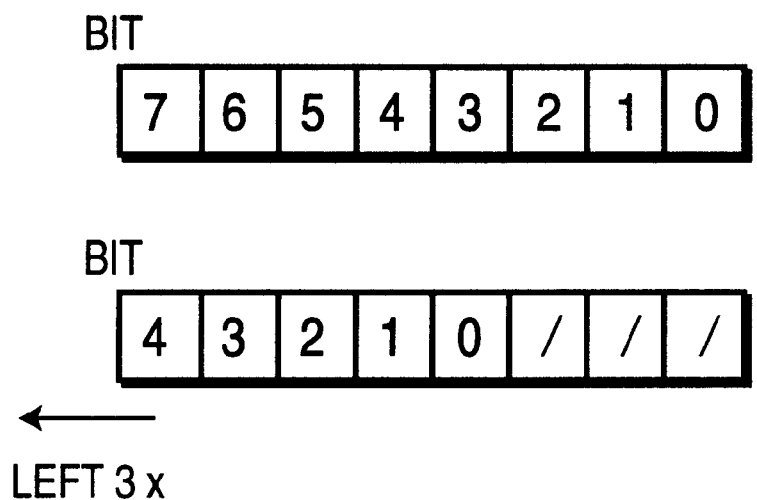
Figure 13B:
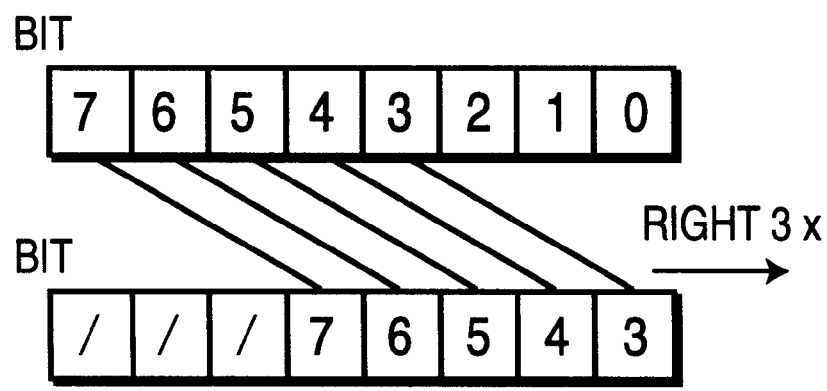
Figure 14:
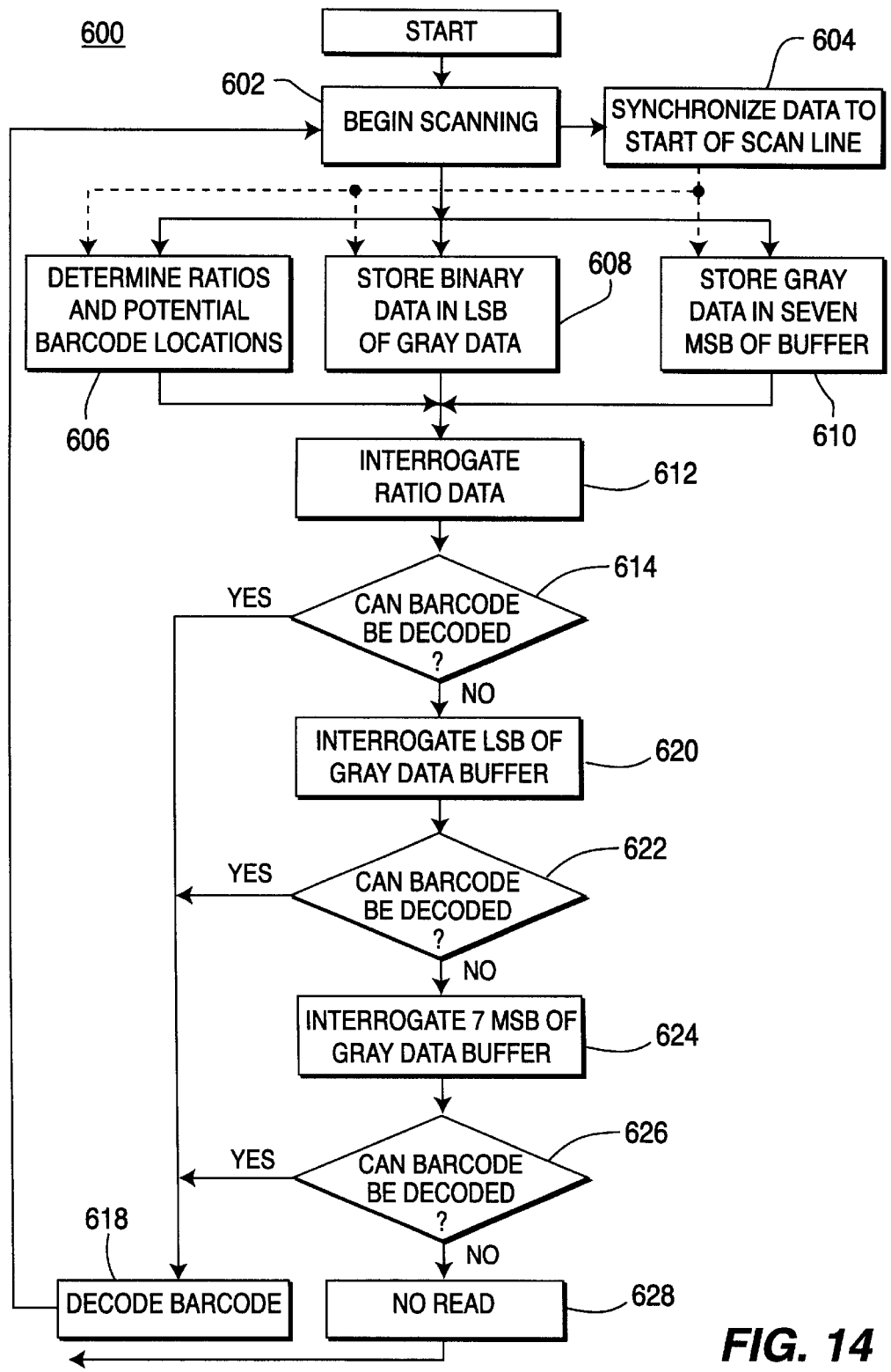

FIG. 13A graphically illustrates calculation of $2^N$ of a number by shifting the register left N times;

FIG. 13B graphically illustrates calculation of $\frac{1}{2}^N$ of a number by shifting the register right N times; and FIG. 14 is a flow diagram of the locating and decoding procedure.

DETAILED DESCRIPTION OF THE PREFERRED EMBODIMENT(S)

Figure 1:
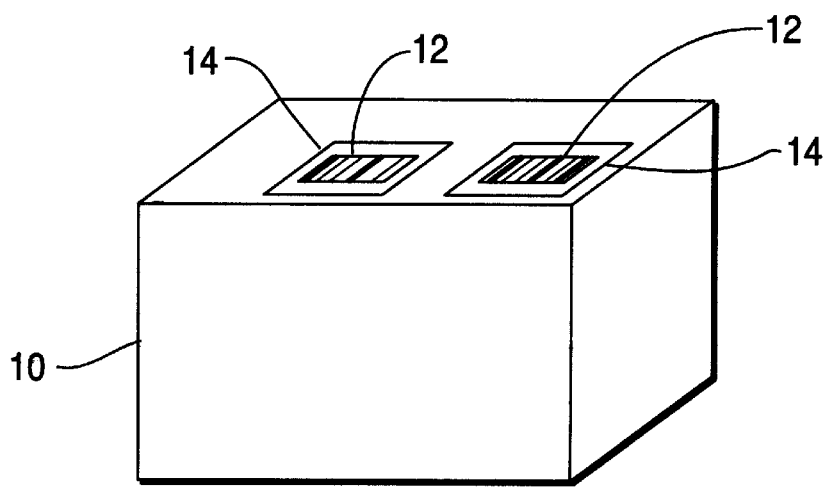
FIG. 1 is a package having several coded symbology labels located thereon.
Figure 2:
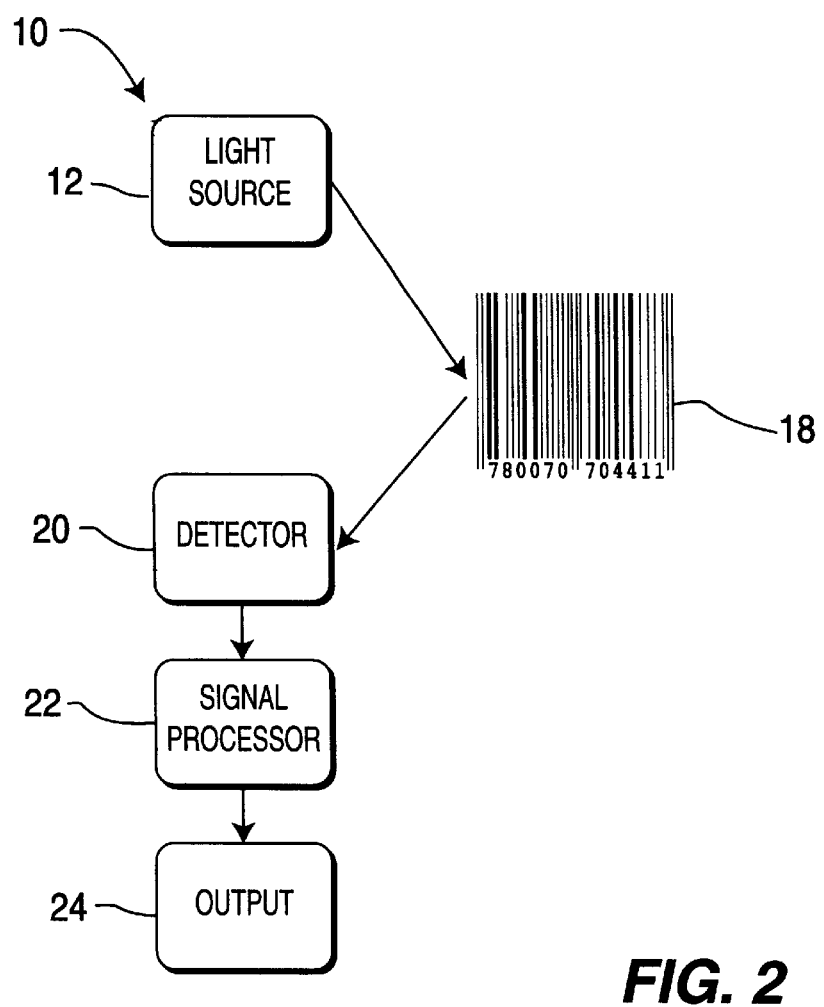
FIG. 2 is the coded symbology scanning system made in accordance with the present invention.

The preferred embodiment will be described with reference to drawing figures wherein like numerals represent like elements throughout. Referring to FIG. 2, a coded symbology scanning system 10 made in accordance with the present invention is shown. The coded symbology scanning system 10 is able to scan any type of coded symbology. However, for simplicity, reference hereinafter will be made to a particular type of coded symbology, i.e. a barcode symbol.

The scanning system 10 comprises a light source 12 which illuminates a subject barcode symbol 18. Light reflected from the barcode symbol 18 is detected by a photo-sensitive detector 20. The detector produces an electrical signal representative of the light reflected from the barcode symbol 18 which is output to the signal processor 22. The signal processor 22 decodes the signal and forwards the resulting information, which corresponds to the information encoded in the barcode symbol 18, to an output means 24. The output means 24 may be a printer, a CRT or an information system as is well known by those skilled in the art.

The scanning system 10 shown in FIG. 2 may be embodied in a mobile hand-held unit, or may be a stationary unit whereby an object carrying the barcode symbol 18 is passed under the light source 12 either manually or via a conveyor. In the preferred embodiment, the light source 12 is a laser light source and the detector 20 is a photo detector capable of detecting the reflected laser light.

Figure 3:
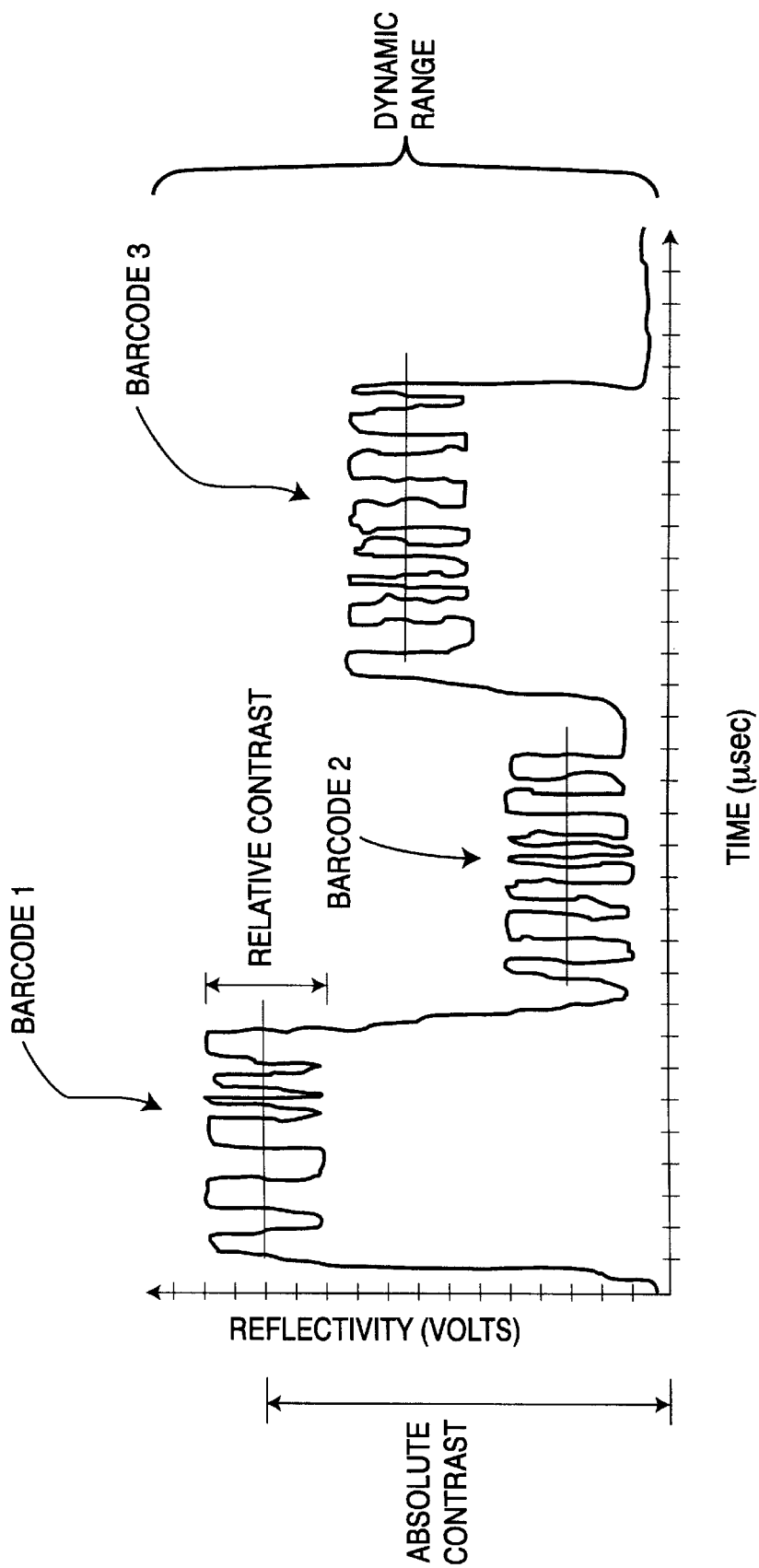
FIG. 3 is a signal diagram showing several barcode labels having different reflectivities on a single package.

As shown in FIG. 3, the scanning system 10 may encounter several different barcode labels having different reflectivities on a single package. In order to be able to handle a plurality of different labels having different reflectivities, the scanning system 10 must have a wide dynamic range. It is desirable to compress the dynamic range of the signal in order to increase the sampling resolution of the stored information.

Figure 4:
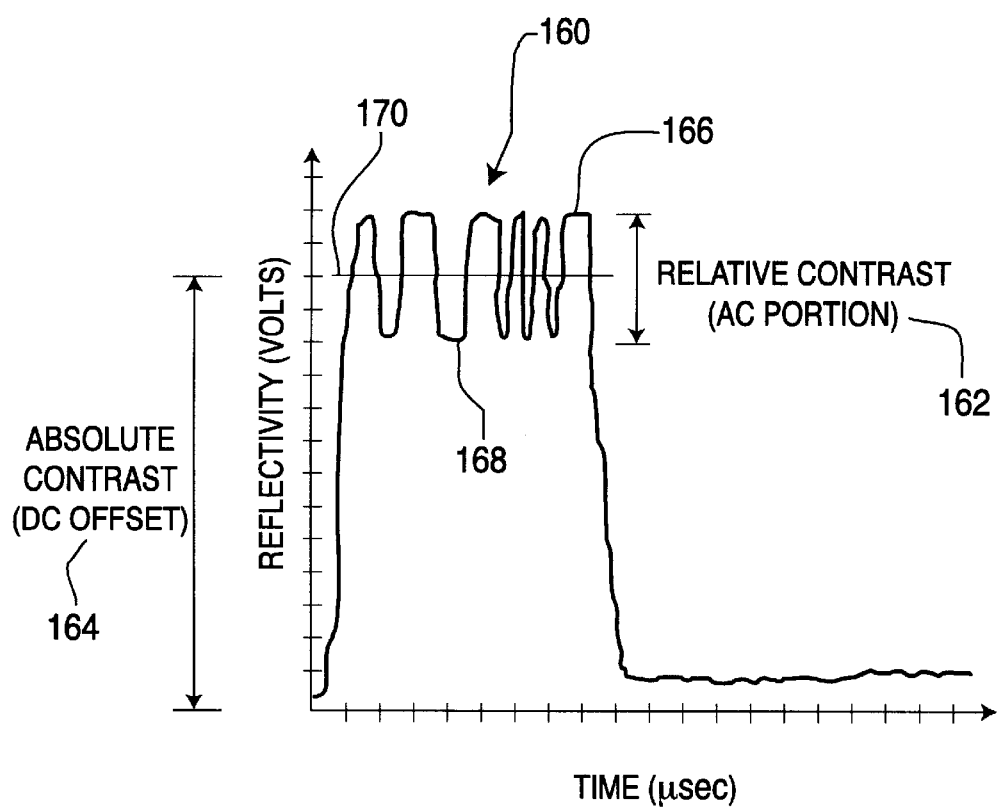
FIG. 4 is a signal diagram of the analog waveform obtained after scanning.

The analog waveform 160 obtained after scanning contains two components as shown in FIG. 4: 1) the relative contrast or AC portion 162 of the signal which represents the data encoded in the barcode symbol 18; and 2) the absolute contrast or DC offset portion 164 of the waveform which represents the reflectance of the substrate. Since the absolute contrast portion 164 of the signal does not contain any data encoded in the barcode symbol 18 this portion 164 may be discarded. Alternatively, if it is desired to retain this portion 164, it may be separately encoded and stored. When the absolute contrast portion 164 of the signal is removed, the available dynamic range may be used entirely for the information-bearing portion 162.

Figure 5:
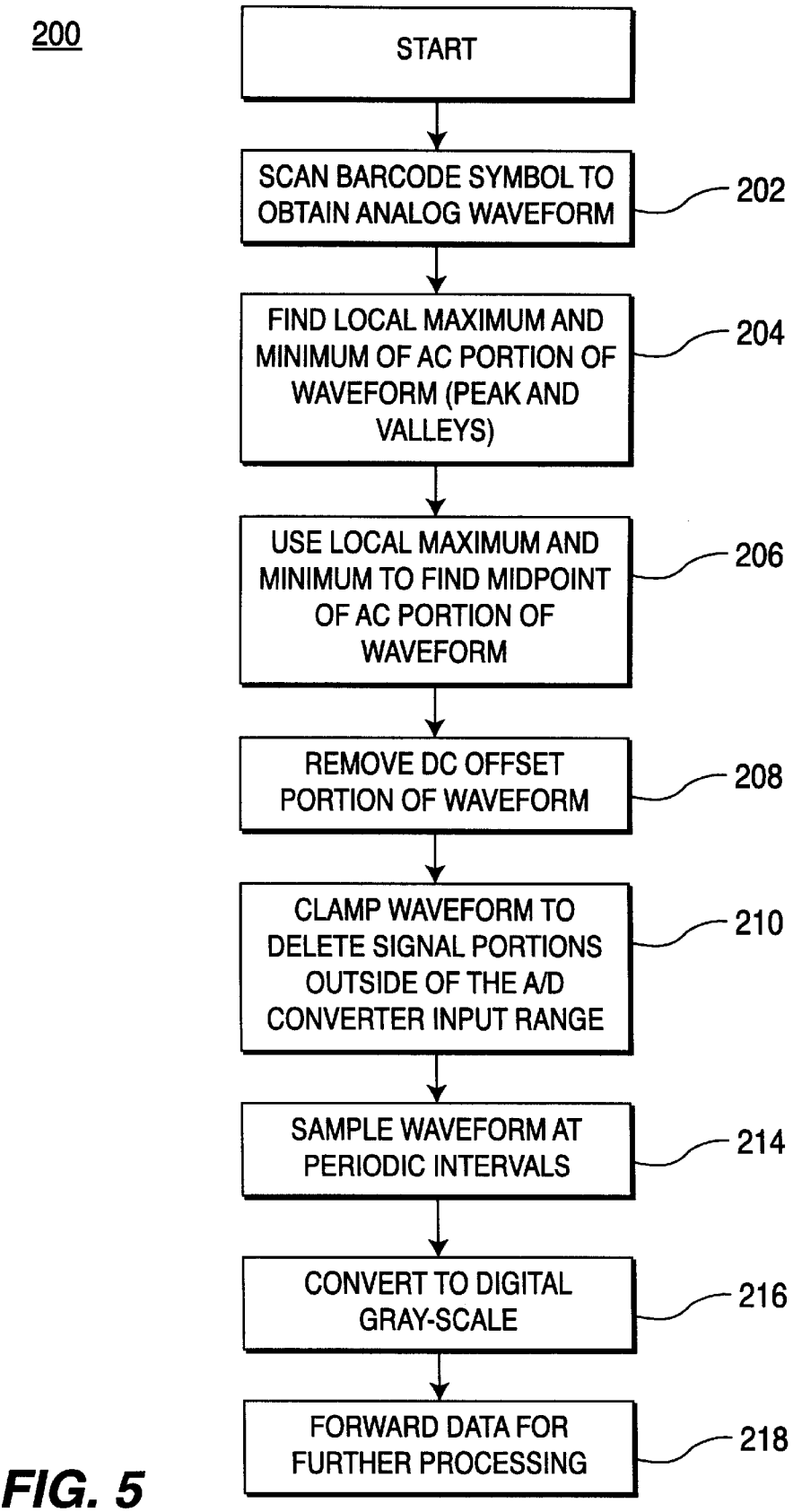
FIG. 5 is a flow diagram of the waveform conditioning and preprocessing method of the present invention.
Figure 6A:
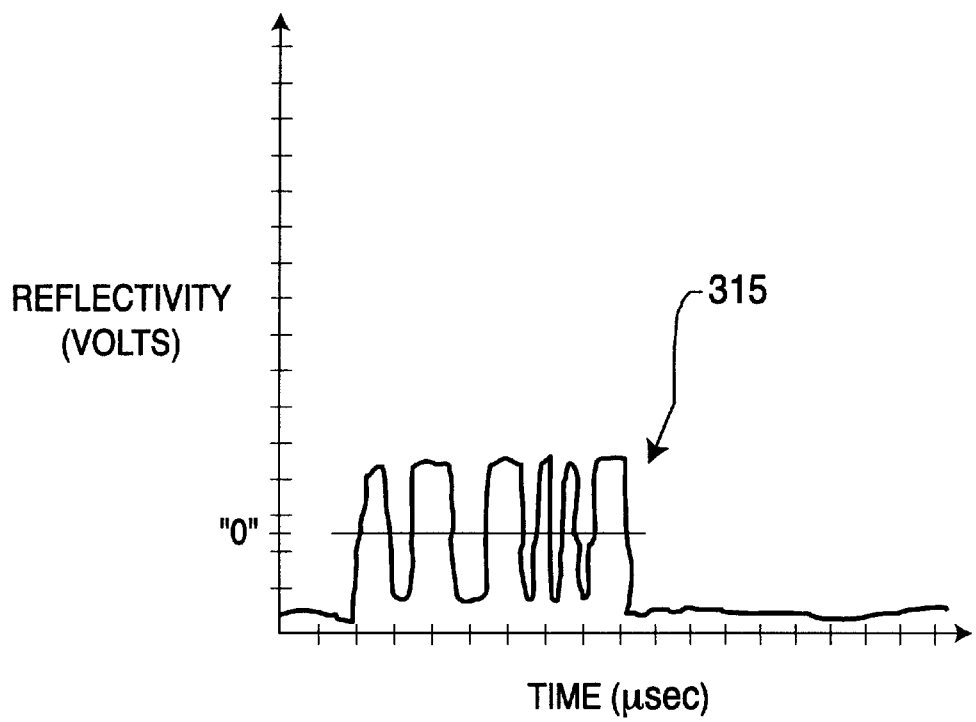
FIG. 6A is a signal diagram of a DC offset-adjusted waveform.

The method-of waveform conditioning and preprocessing 200 in accordance with the present invention will be briefly explained with reference to FIG. 5. After the label having the barcode symbol 18 located thereon is scanned to obtain the analog waveform (step 202), the local maximum 166 of the AC portion 162 of the waveform 160 and the local minimum 168 of the AC portion 162 of the waveform 160 are determined (step 204). These values 166, 168 are utilized to find the midpoint 170 of the waveform (step 206) which represents the DC offset 164. The DC offset 164 is subtracted from the AC portion 162 of the waveform to provide a DC offset-adjusted waveform 315 as shown in FIG. 6A (step 208).

Referring again to FIG. 5, the DC offset-adjusted waveform 315 is clamped to delete those portions of the signal that are outside of the input range of an A/D converter 322 (step 210). AC amplitude information exceeding the practical limits necessary for reading the symbology is clipped using a diode-based peak and valley limiter circuit 316.

The clamped signal 317 is then DC level shifted to coincide with the input range of the A/D converter 322. As will be explained in greater detail hereinafter, the clamped signal 317 is offset adjusted such that the signal 317 is centered upon the output dynamic range of the A/D converter 322. The signal 317 is then sampled at periodic intervals (step 214), at the Nyquist frequency or greater, by clocking the A/D converter 322 with the system clock 324. In the preferred embodiment, the sampling interval is 25 $\mu$sec. The analog samples are converted to digital gray-scale form (step 216) and are then forwarded for further processing (step 218).

Most barcode scanner analog preprocessing circuits utilize alternating current (AC) coupling. AC coupled circuits automatically remove the DC portion of a scanning signal by using a series RC circuit to couple gain stages. The capacitor blocks the direct current (DC) component of the scan signal. The amount of the DC component that is blocked is a function of the time constant generated by the RC circuit. Although this coupling technique works well under ordinary conditions, specular reflection causes the RC circuit to distort the detected barcode signal during the recovery stage, often rendering the barcode symbol unrecognizable. Accordingly, this coupling technique is undesirable for applications that may experience specular reflection.

In a DC coupled circuit, the DC content in the form of amplitude information is preserved. This permits specular reflection to be identified by detecting the amplitude of the scanning signal. However, removing the DC portion of the scan signal and processing the signal is often very difficult. As a result, in spite of the drawbacks, most current barcode scanning systems utilize AC coupled preprocessing circuits.

Figure 6B:
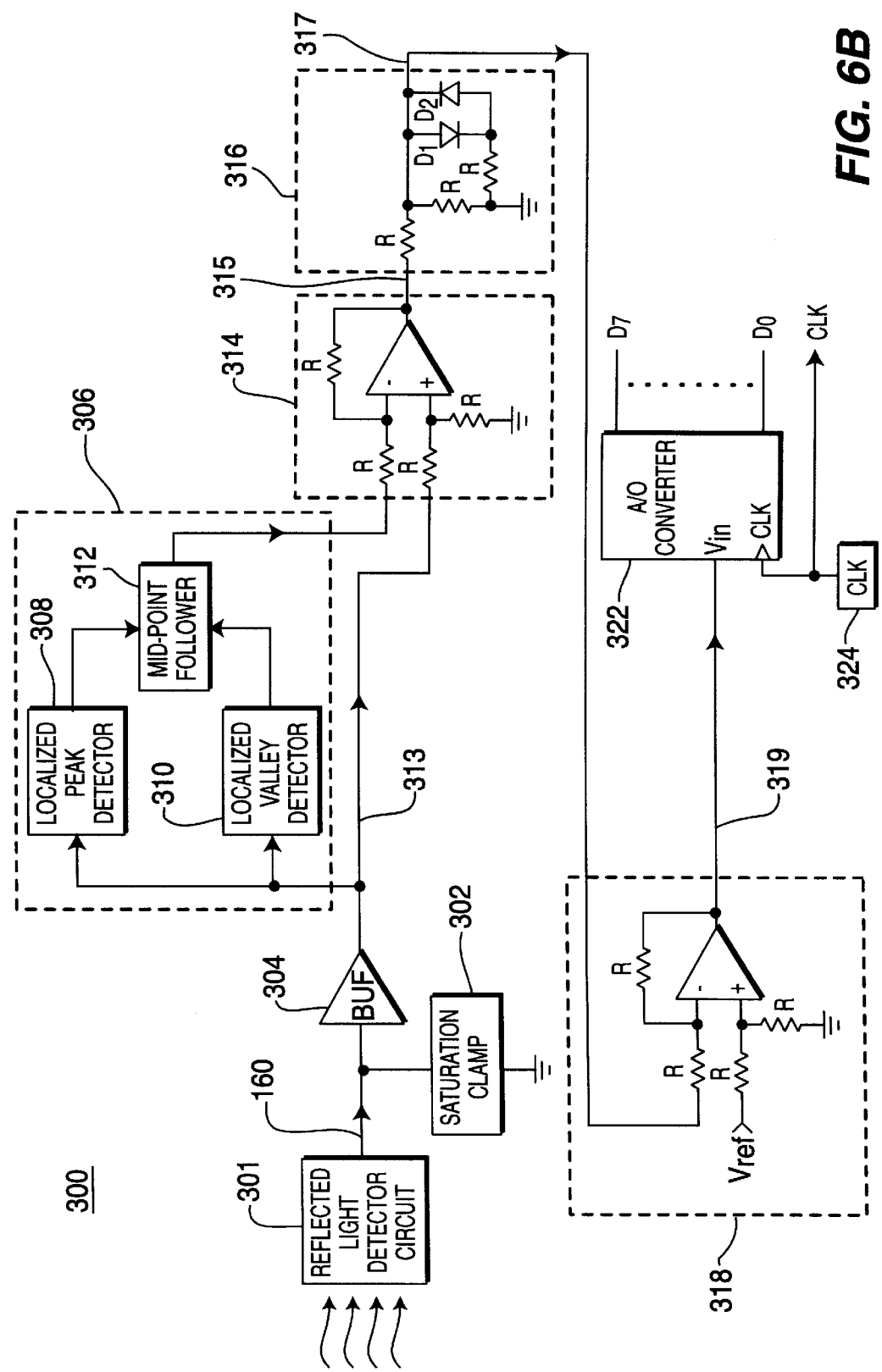
FIG. 6B is a waveform preprocessor used in accordance with the present invention.

The preferred embodiment of the waveform preprocessor 300 shown in FIG. 6B is a DC coupled circuit. After the light reflected from the barcode symbol 18 has been detected by the detector circuit 301, the analog signal 160 is passed through a saturation clamp 302 and a buffer 304. The saturation clamp 302 removes erroneous data caused by specular reflections and which is also clearly outside the input range of the A/D converter 322. The buffer 304 drives a DC offset analyzer 306, (including a local peak detector 308, a local valley detector 310 and a midpoint follower 312). The DC offset analyzer 306 detects the localized peaks of the signal using the peak detector 308 and the localized valleys of the signal using the valley detector 310. The midpoint follower 312 establishes the midpoint between the peaks and valleys, which is the DC offset 164. The DC offset 164 is subtracted from the buffered signal 313 using a subtractor 314 to provide a DC offset-adjusted waveform 315 as shown in FIG. 6A.

A diode-based limiting circuit 316 clamps any signal portions which extend outside of a preset range. The clamped signal 317 is input into a DC offset adjuster 318, which ensures that the DC component of the clamped signal 317 corresponds to the midpoint of the output dynamic range of the A/D converter 322. As the clock 324 clocks the A/D converter 322, a digital output corresponding to the DC offset adjusted signal 319 is generated. Accordingly, when the voltage of the DC offset-adjusted signal 319 is at the input minimum of the A/D converter 322, the output from the A/D converter 322 is 00. Similarly, when the voltage of the DC offset-adjusted signal 319 is at the input maximum of the A/D converter 322, the output of the A/D converter 322 will be FF. One skilled in the art should clearly recognize that the specific hardware implementation shown in FIG. 6B is illustrative only. These functions may be implemented in many forms without departing from the spirit and scope of the present invention.

Figure 7A:
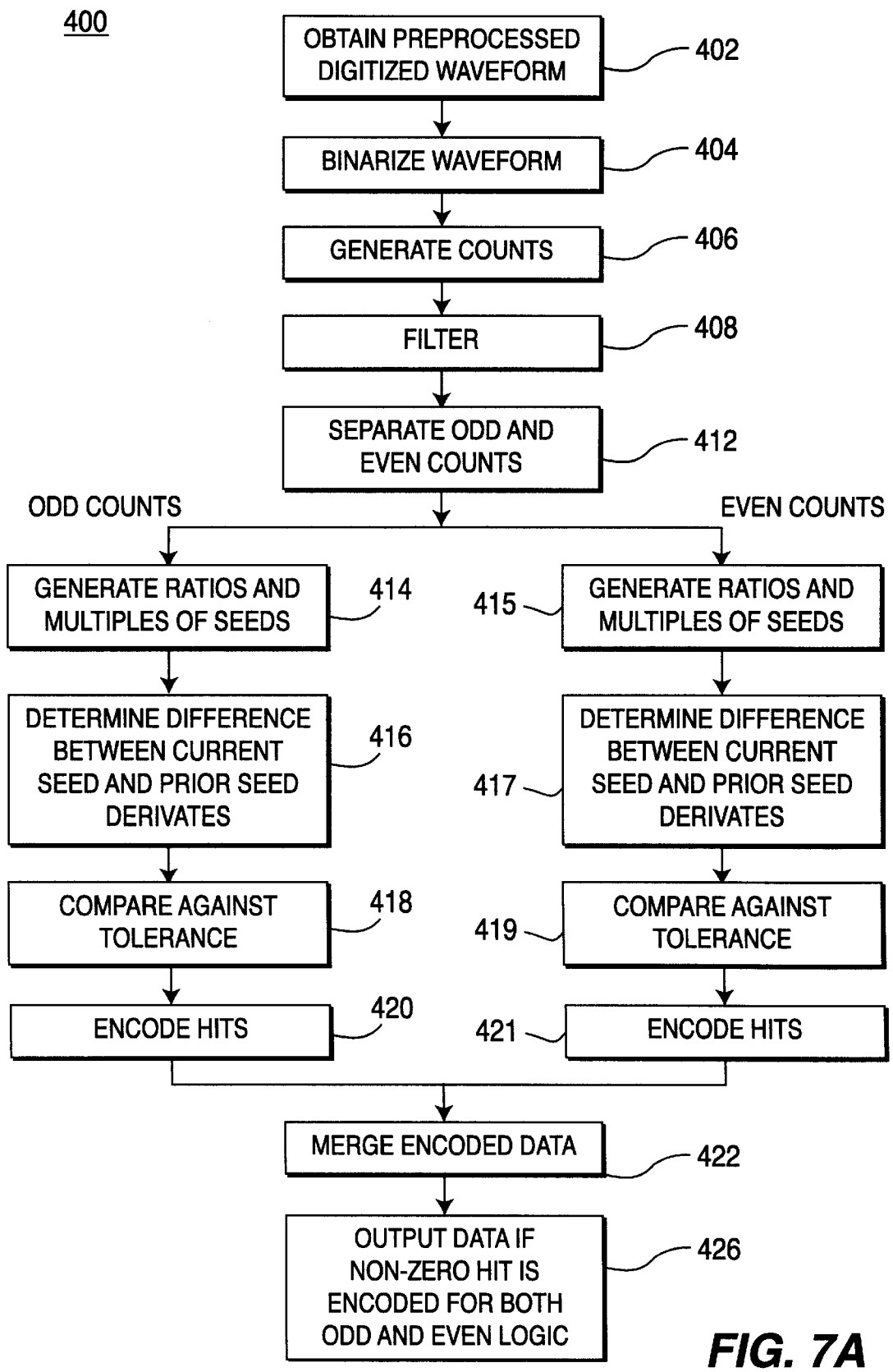
FIG. 7A is a flow diagram of the barcode symbol locating procedure in accordance with the present invention.

After the analog waveform 160 has been preprocessed, the system 10 executes a barcode symbol locating procedure 400 which will be briefly explained with reference to FIG. 7A. The waveform is obtained from the preprocessing unit (step 402), and is thresholded to produce a binary waveform (step 404), whereby the portions of the waveform having a reflectivity greater than a predetermined threshold value are set to logical one, and the portions of the waveform having a reflectivity lower than a predetermined threshold are set to logical zero. The system 10 then counts the duration of each pulse and generates a digital "count" (step 406). The counts are filtered (step 408) and alternating (odd and even) counts are separated (step 412). The system 10 then performs a series of steps on the odd and even counts to determine the existence of potential barcode candidates (steps 414, 416, 418, 420 and steps 415, 417, 419, 421). The data is merged (step 422) and output when there is a potential candidate found by both the odd and even logic (step 426). The result of the symbology locating procedure 400 is that the processing power of the scanning system 10 will be focused only upon those portions of the scanned data which include potential barcode candidates.

Figure 7B:
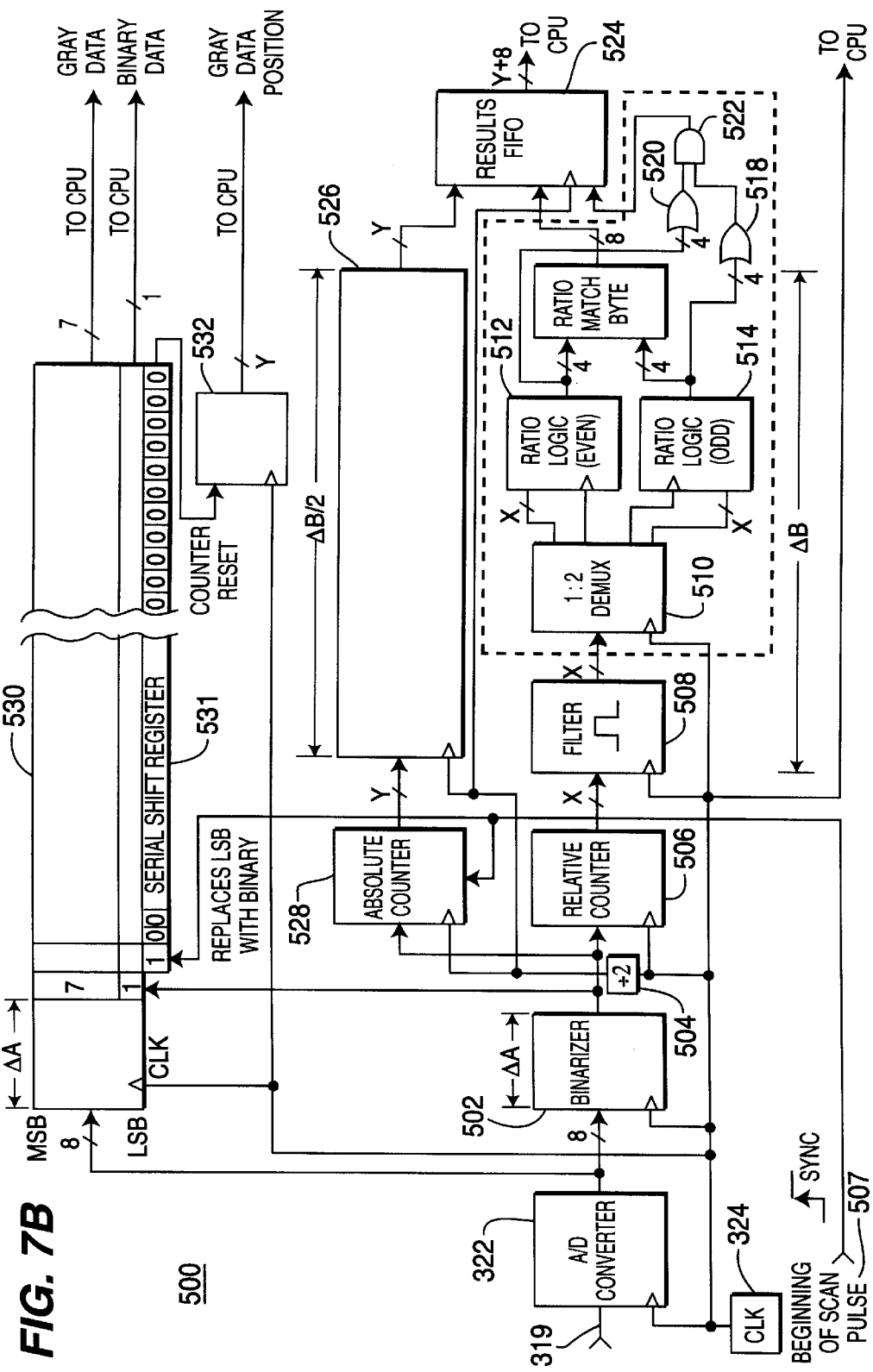
FIG. 7B is the symbology locating unit used in accordance with the present invention.

In the preferred embodiment, the symbology locating procedure 400 is implemented by the symbology locating unit 500 as shown in FIG. 7B. The digital data is output from the A/D converter 322 into the binarizer 502 and a gray data buffer 530. Binarization of the waveform as implemented by the binarizer 502 will be described in greater detail with reference to FIG. 8.

Figure 9:
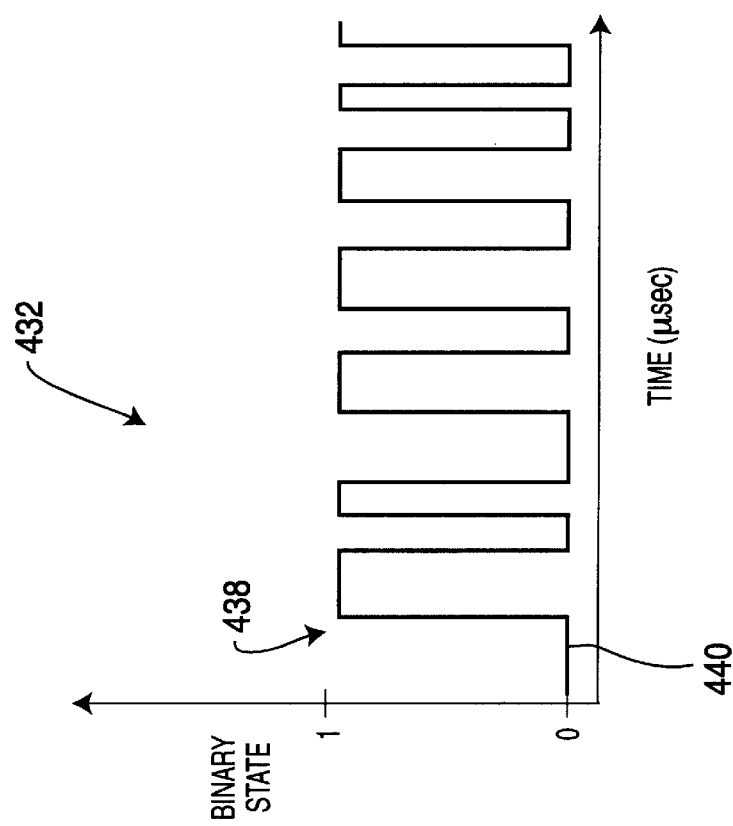
FIG. 9 is a signal diagram of the waveform of FIG. 8 after the step of binarization.
Figure 8:
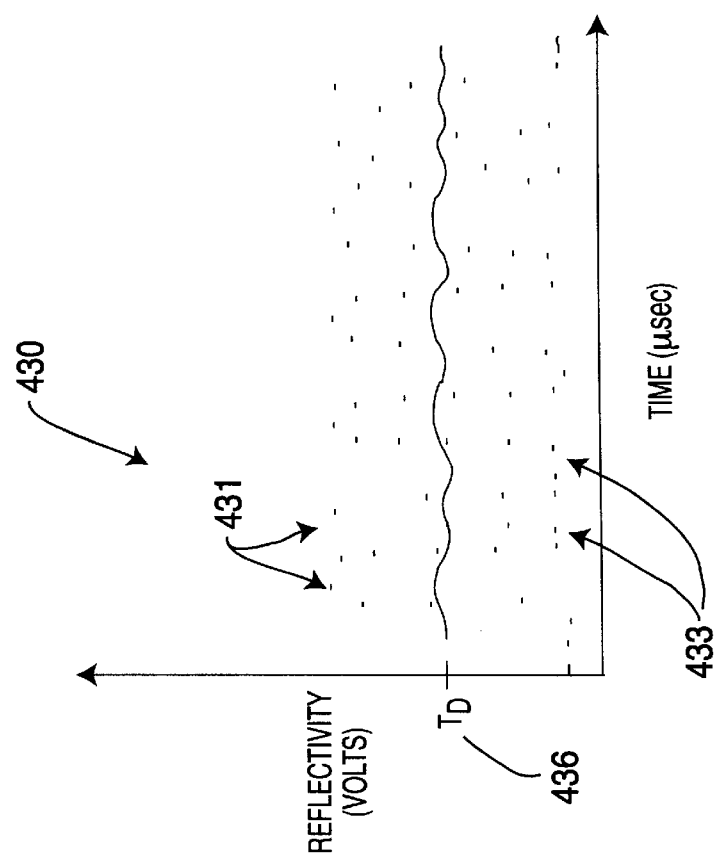
FIG. 8 is a signal diagram of a waveform before the step of binarization.

The output 430 from the A/D converter 322 corresponds to areas of low and high reflectivity. The localized areas of high reflectivity 431 correspond to spaces, while the localized areas of low reflectivity 433 correspond to bars. A dynamic threshold $T_D$ is then established based on the localized peaks 431 and valleys 433. When the input digital waveform exceeds $T_D$ 436, the output is considered to be a logical one 438. When the input digital waveform is below $T_D$ 436, the output is considered to be a logical zero 440. Using this threshold $T_D$ 436, the digital waveform of FIG. 8 is converted into the binary output 432 of FIG. 9.

Referring again to FIG. 7B, the binary output 432 is input into a relative counter 506 and an absolute counter 528. The binary output 432 also replaces the least significant bit in synchronization with the data contained within gray data buffer 530. The purpose of this replacement will be explained in detail hereinafter.

The relative counter 506 counts the duration of each pulse, which relates to the width of a detected element (i.e. bar or space), and stores the duration corresponding to each pulse as a digital count. The result shown in FIG. 10A, comprises a series of "relative counts". The absolute counter 528 generates a running tabulation of "absolute counts", measured from the beginning of the scan line, as shown in FIG. 10B. The absolute counter 528 is synchronized or reset with a pulse 507 generated at the beginning of each scan line.

The relative counts are fed into a bandpass filter 508, shown in FIG. 11 to eliminate those pulses or counts having a duration greater or less than an expected duration for a coded symbology. For example, pulses having a duration less than 4 counts, or greater than 100 counts, will be forced to zero. All pulses having counts within the acceptable range are passed for further processing. Filtering permits the system 10 to focus computational resources on symbology candidates which fit within a certain range, thereby analyzing only the most promising barcode candidates.

Referring back to FIG. 7B, the potential candidate locating unit 509 operates on all counts that have passed the filtering step. The candidate locating unit 509 comprises 1:2 demultiplexer 510, even ratio logic 512, odd ratio logic 514, a 2:1 combiner 516, two OR gates and an AND gate 522. The candidate locating unit 509 analyzes the relative counts and determines whether a potential barcode candidate exists at the location being analyzed.

Figures 12, 12A:
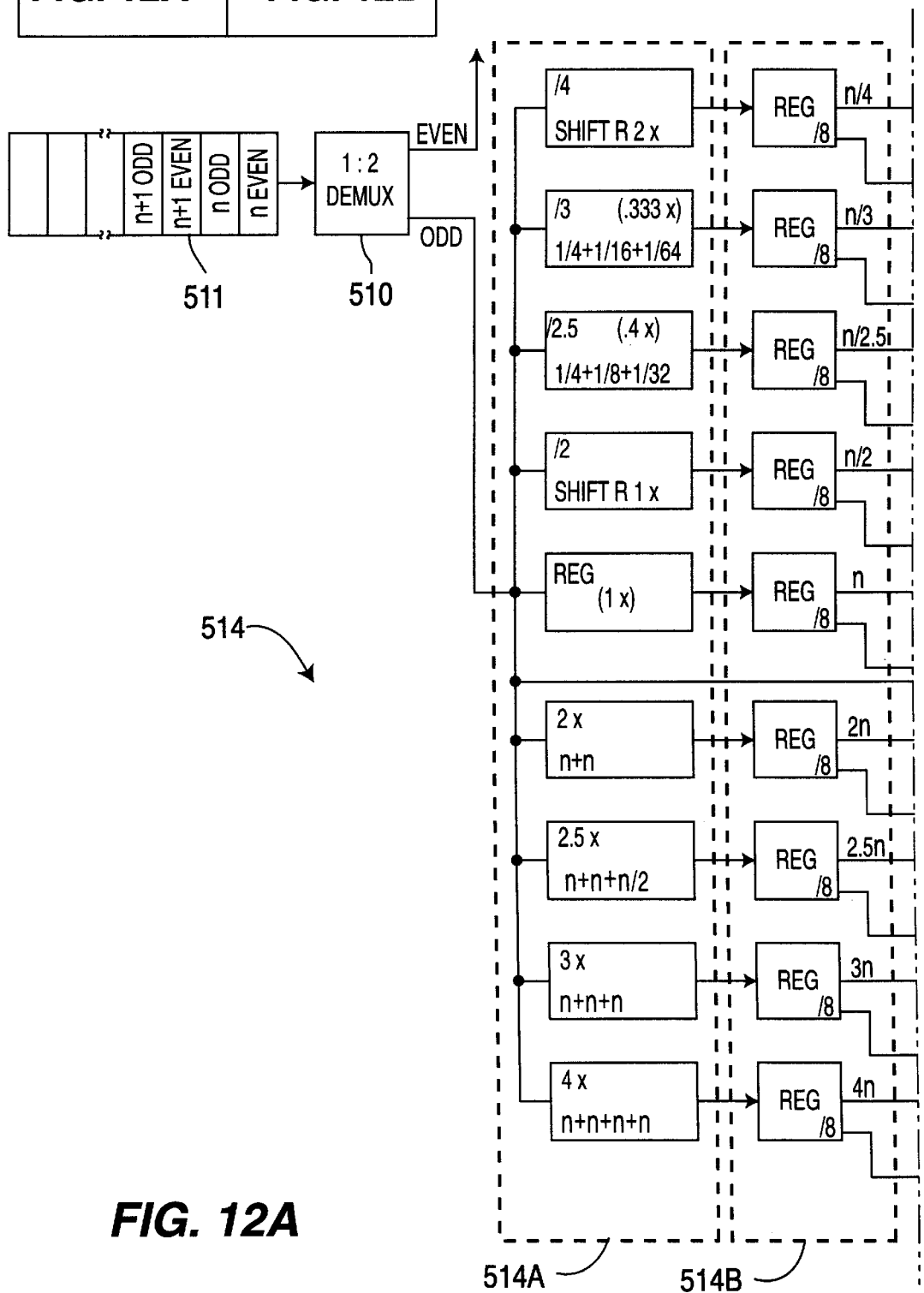
FIG. 12 is a block diagram of the hardware locating unit.
Figure 12B:
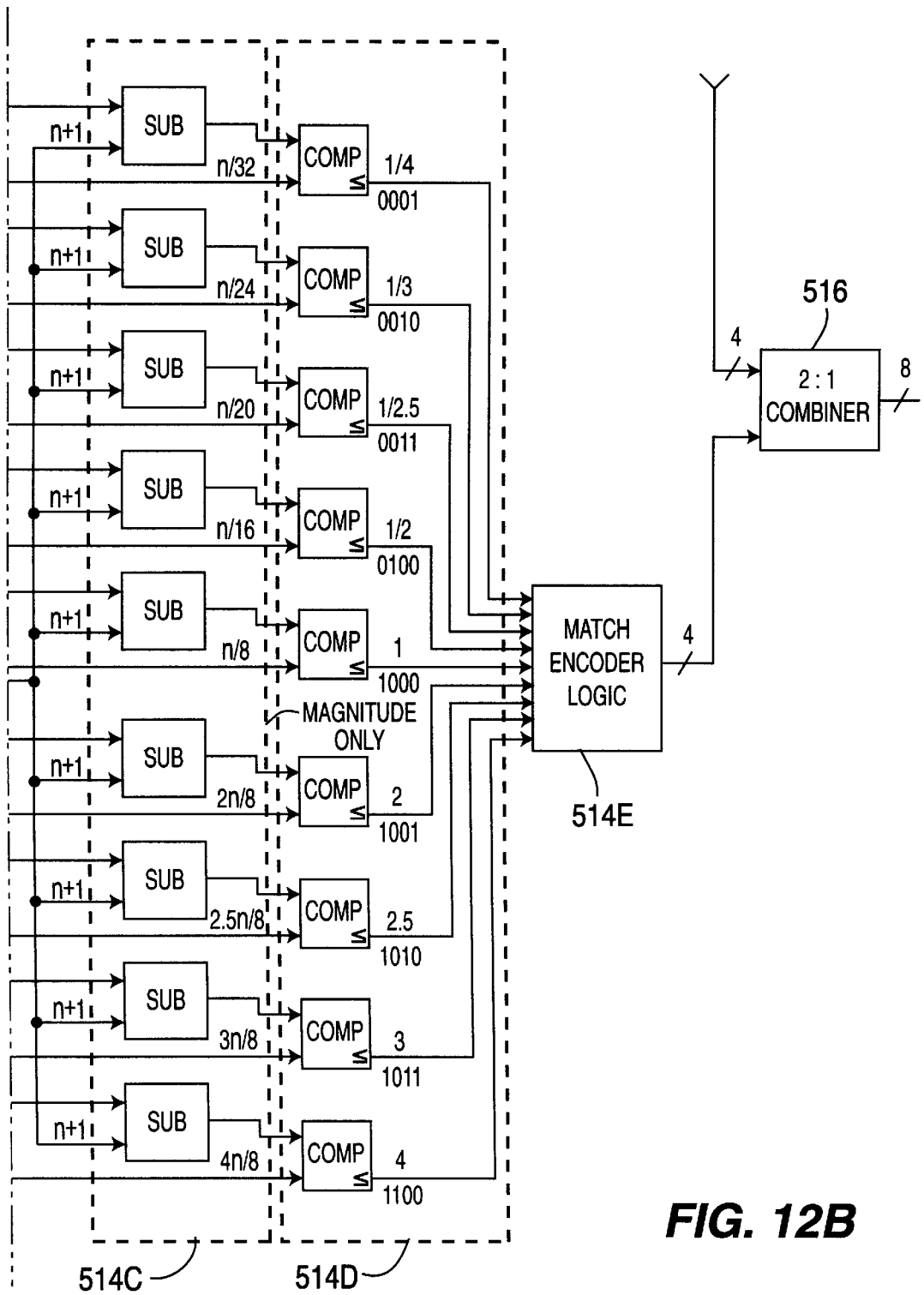

The potential candidate locating unit 509 is shown in greater detail in FIG. 12. The relative counts 511 comprise one or more bytes corresponding to the binary pulse duration as measured with respect to the system clock 324. The relative counts are sequentially entered into the 1:2 demultiplexer 510, which separates the alternating "odd and even" counts or "seeds". This permits potential bar candidates to be compared with subsequent bar candidates, and potential space candidates to be compared with subsequent space candidates. One skilled in the art should realize that potential bar candidates may be compared with subsequent potential space candidates. This would eliminate the 1:2 demultiplexer 510, either of the odd or even ratio logics 512, 514 and the combiner 516.

The forgoing discussion will focus on the odd candidates, however, this discussion applies equally to the even candidates. As each seed is transferred out of the demultiplexer 510, it enters a "shift and add" stage 514A wherein a plurality of values based upon the ratios and multiples of the input seed are generated for each input seed. All of the ratios/multiples may be generated by simple shifting, or shifting and adding, each byte of data to provide a computationally efficient method of generating the values. In order to calculate $2^N$ of a number, the register is shifted left N times as shown in FIG. 13A. In order to calculate $\frac{1}{2}^N$ of a number, the register is shifted right N times as shown in FIG. 13B. Longer or shorter shift registers may be utilized depending upon the particular requirements of the system 10 and which multiples/ratios must be calculated.

Combinations of shifting and adding are used to generate a plurality of ratios and multiples. Preferably, the ratios/multiples of ¼, ⅓, ½.5, ½, 1, 2, 2.5, 3 and 4 are generated for each seed as shown in the below table. Additionally, the ratios/multiples are expressed only in integer form.

TABLE 1

| Multiplier Of Original Seed | Action Taken (Shift and Add) |
|---|---|
| ¼ | (Shift Right 2X) |
| ⅓ | (Shift Right 2X) + (Shift Right 4X) + (Shift Right 6X) |

TABLE 1-continued

| Multiplier Of Original Seed | Action Taken (Shift and Add) |
|---|---|
| ½.5 | (Shift Right 2X) + (Shift Right 3X) + (Shift Right 5X) |
| ½ | (Shift Right 1X) |
| 2 | (Shift Left 1X) |
| 2.5 | (Shift Left 1X) + (Shift Right 1X) |
| 3 | (Shift Left 1X) + (Original Seed) |
| 4 | (Shift Right 2X) |

For example, if an input seed has a value of 50, the following values will be generated: 12, 20, 25, 50, 100, 125, 150 and 200, (note that only integers are generated).

Each output value from the shift and add stage 514A enters a shift register 514B which has two outputs. The first output is fed into a subtractor 514C which subtracts value of the subsequent seed from the multiple/ratio determined from the prior seed to determine the absolute difference. The second output from the shift register 514B comprises an input which has been divided by eight, (or shifted right three times), to provide a tolerance 2.5% of the input value. Since the tolerance depends upon the output from each shift register 514B, it provides a computationally efficient method of dynamically determining the tolerance.

The absolute difference output from the subtractor and the dynamic tolerance are compared in a comparator 514D. If the output from the subtractor 514C is less than or equal to the dynamic tolerance, it is determined that a valid ratio match has been found. In essence, this means that the value of the prior seed's derivative and the value of the subsequent seed are within 12½% of each other. The encoder 514E encodes each valid ratio match with a 4 bit "nibble" as shown in FIG. 12. For example, if a valid ratio match is found for a ratio of ½, the nibble "0100" will be output from the encoder 514E into the 2:1 combiner 516.

At this point, the importance of filtering the data with the bandpass filter 506 shown in FIG. 11 should be realized. Filtering prevents the system 10 from generating erroneous ratio matches. For example, without the bandpass filter 508, a seed of 200 will be permitted to pass through for further processing. The following values will be generated: 50, 66, 80, 100, 200, 400, 500, 600, 800. A subsequent seed having a value of 50 would produce a ratio match of ¼:1. Although the ratio of ¼:1 is detected, it will be improper since the initial value of 200 would be clearly outside of the range of an expected barcode. Using the bandpass filter 508, the seed with a value of 200 will be forced to zero, thereby forcing all of the derivatives to zero. When the subsequent seed is compared to the derivatives of the prior seed (zero), no matches will be found.

As discussed above, FIG. 12 illustrates the signal processing associated with the odd counts. The same operation will be performed in parallel on the even counts as shown in FIG. 7B. The combiner 516 will only output a "hit" if a valid ratio match is found in both the even and odd ratio logics 512, 514. Accordingly, a consecutive match of alternating logic blocks is required for a hit to be output.

When a number of hits have been detected within a predetermined range, it is likely that a barcode label exists at that location. The system 10 may begin to decode the barcode symbology information associated with that location or may continue to locate other potential barcode candidates prior to the decoding process.

Using the ratios/multiples, the system 10 has determined the existence of potential barcode candidates. If the ratios/multiples (hereinafter, the "ratio" data) have been accurately detected, the barcode symbol may be decoded on the basis of the ratio data. The absolute location of the barcode candidate is stored in the shift register 526 and output with the ratio data by a results FIFO 524. The ratio data provides an extremely fast and efficient method of locating and decoding barcode symbols. However, if there are errors in the data, the system 10 must resort to "higher level" data to perform decoding of a barcode symbol.

As shown in FIG. 7B, there are two additional processes which occur in parallel with the symbology locating procedure 400. First, the binary data from the binarizer 502 is stored directly in the data in the gray data buffer 530 by replacing the least significant bit of the gray data with the binary data. The serial shift register 531 receives a single pulse, generating a logical 1, at the beginning of each scan line. The serial shift register 531 is clocked in parallel and in synchronization with the gray data buffer 530. When the logical 1 enters the counter 532, it resets the counter 532. Thus, the counter 532 provides the absolute position of the binary and gray data with respect to the beginning of the scan line.

Second, the gray data from the scan line is stored in the gray data buffer 530. If the CPU (not shown) is unable to decode the barcode symbol from the ratio data of the output FIFO 524, or from the binary data contained in the least significant bit of the data in the gray data buffer 530, the CPU uses the remaining seven bits of amplitude information contained within the gray data buffer 530. Since the location of the barcode has been potentially located by the candidate locating unit 509, the CPU focuses upon the gray data in the vicinity of the location of the potential candidate. By locating candidates in hardware using the candidate locating unit 509 as hereinbefore described, the available CPU power can be focused on a localized area in greater detail.

The location and decoding functions occur in parallel, with the location function occurring slightly ahead of the decoding of the same scan line. This is because as the ratio data is being searched for potential candidates, the associated binary data and gray data is being buffered in the gray data buffer 530. During the processing of the data from a particular scan line, the CPU reads out the stored results. Only regions of data in the vicinity of the areas indicated by the candidate locating unit 509, as output by the results FIFO 524, are analyzed for further processing. If there are no entries in the results FIFO 524, the corresponding data for the scan in the gray data buffer 530 is discarded.

The locating and decoding procedure 600 in accordance with the present invention can be summarized with reference to FIG. 14. As the system 10 begins scanning a particular scan line (step 602), data is obtained and stored in three parallel processes. First, the system 10 stores binary data and determines the ratios and potential barcode locations (step 606). Secondly, the system stores the binary data in the least significant bit of the gray data buffer 530 (step 608). Finally, the system stores gray data in the seven most significant bits of the gray data buffer 530 (step 610). The data is each of these processes (steps 606, 608, 610) is synchronized to the start of the scan line (step 604). The system 10 then interrogates the ratio data (step 612), and if the barcode symbol can be decoded from the ratio data (step 614), the barcode symbol is decoded (step 618). If the barcode symbol cannot be decoded from the ratio data, the system 10 interrogates the least significant bit of the gray data buffer 530, which is the binarized data (step 620). If the barcode symbol can be decoded from the binary data (step 622) the barcode symbol is decoded (step 618). If the barcode symbol cannot be decoded from the binary data, the system 10 interrogates the seven most significant bits of the gray data buffer 530, which is the gray data (step 624). If the barcode symbol can be decoded from the gray data (step 626) the barcode symbol is decoded (step 618), otherwise, the system 10 outputs a "no read" error message (step 628).

This three-step process of locating and decoding potential barcode candidates significantly increasing scanning speed and accuracy by focusing CPU resources only on the most promising barcode candidates.

Although the invention has been described in part by making detailed reference to certain specific embodiments, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. A device for locating a bar code symbology on a presented surface, the device having a light source for illuminating the surface; a detector for generating a light intensity signal that corresponds to transitions in reflected light from the surface; and a processor for processing the light intensity signal to identify the potential location of the bar code symbology; the processor comprising:

a signal generator for generating, from the light intensity signal, a series of counts which identify transitions in the light intensity;

a locator for determining a location of each of the counts;

a separator for separating the series of counts into alternating odd and even counts;

a multiplier for simultaneously multiplying each of the separated counts by a plurality of predetermined values to simultaneously generate a corresponding plurality of odd and even comparison values;

a comparator for comparing said plurality of odd comparison values to a subsequent odd count, and said even comparison values to a subsequent even count, determining whether a comparison is a valid match and outputting a valid match indicator for each valid odd/even match; and a combiner for receiving the comparator outputs and, upon detection of consecutive odd/even comparator outputs, generating a potential bar code match indicator;

whereby the likelihood of the existence of the bar code symbology at a certain location increases with an increasing frequency of potential bar code match indicators.

2. The bar code locating device of claim 1 further comprising an encoder, and whereby said potential bar code match indicator comprises an encoded value corresponding to the width and type of a bar code symbology element.

3. The bar code locating device of claim 1 wherein said plurality of predetermined values comprise $\frac{1}{4}$, $\frac{1}{3}$, $\frac{1}{2.5}$, $\frac{1}{2}$, 2, 2.5, 3 and 4.

4. The bar code locating device of claim 1 wherein higher intensities correspond to areas of higher reflectivity and lower intensities correspond to areas of lower reflectivity.

5. The bar code locating device of claim 4 wherein areas of higher reflectivity correspond to spaces and areas of lower reflectivity correspond to bars.

6. The bar code locating device of claim 1 wherein said comparator determines a positive odd and even match when said compared values are within a predetermined tolerance from each other.

7. The bar code locating device of claim 6 wherein said tolerance is dynamically adjusted for each comparison value.

* * * * *

UNITED STATES PATENT AND TRADEMARK OFFICE
CERTIFICATE OF CORRECTION

PATENT NO.   : 6,508,404 B2
DATED        : January 21, 2003
INVENTOR(S)  : Kurt Hecht It is certified that error appears in the above-identified patent and that said Letters Patent is hereby corrected as shown below:

Column 1,
Line 8, after the word "now", delete "abandon" and insert therefor -- abandoned --.

Column 3,
Line 25, after the second instance of the "detector", insert -- 20 --.

Column 6,
Line 19, after the word "comprises", insert -- a --.

Column 7,
Line 13, after the word "12,", insert -- 16, --.
Line 17, after the word "substracts", insert -- the --.
Line 22, after the word "tolerance", delete "2.5%" and insert therefor -- of 12.5% --.

Signed and Sealed this

Twelfth Day of August, 2003

JAMES E. ROGAN
*Director of the United States Patent and Trademark Office*